April 18, 1961  E. C. GREENWOOD  2,980,392
COMBINATION METERING AND SHUT-OFF VALVE
Filed Aug. 27, 1957
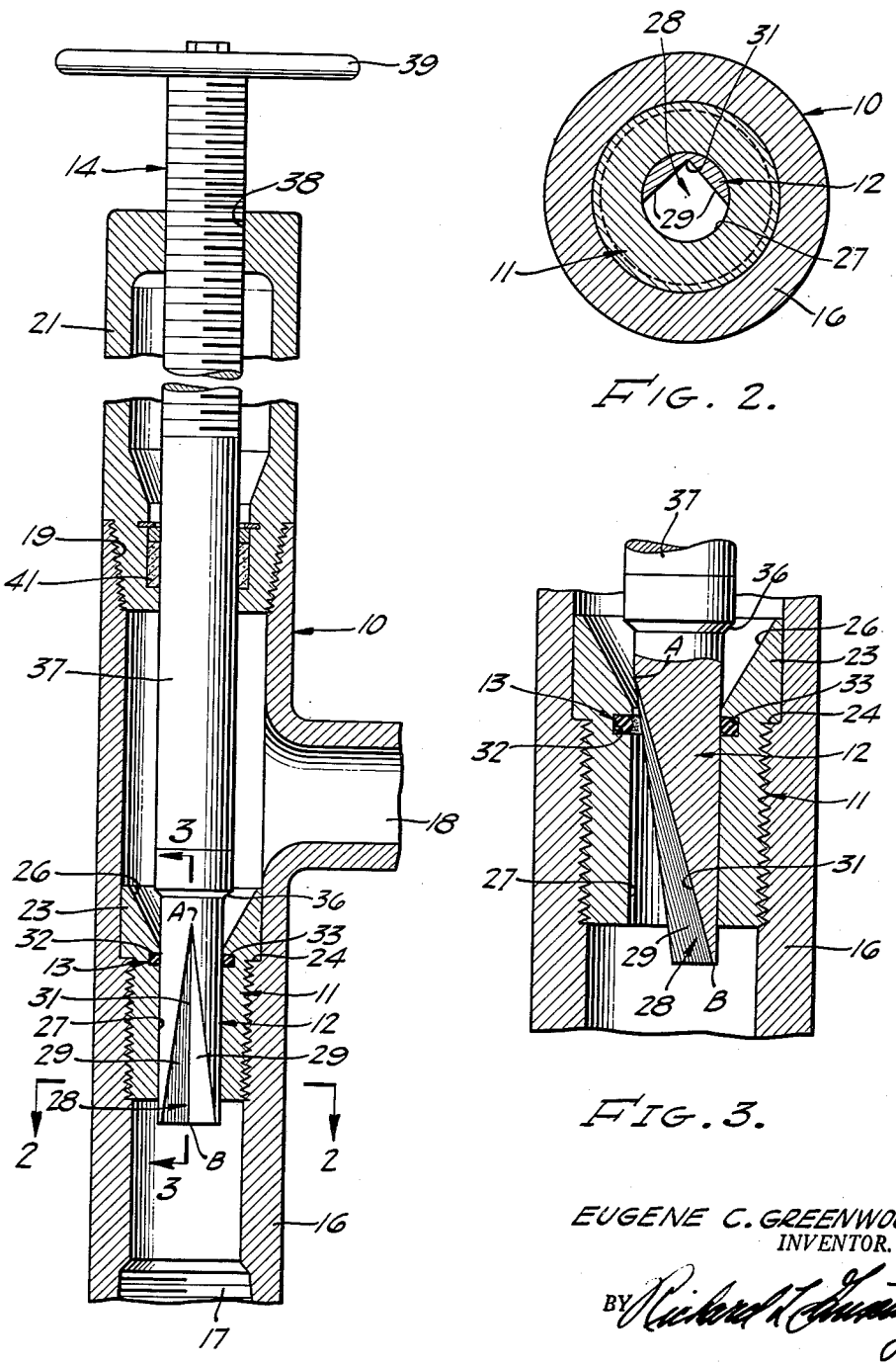
EUGENE C. GREENWOOD
INVENTOR.
BY *Richard L. [signature]*
ATTORNEY United States Patent Office
2,980,392
Patented Apr. 18, 1961

2,980,392
COMBINATION METERING AND SHUT-OFF VALVE
Eugene C. Greenwood, 413 Poinsettia, Corona Del Mar, Calif.
Filed Aug. 27, 1957, Ser. No. 680,458
2 Claims. (Cl. 251—210)

This invention relates to a combination metering and shut-off valve, and more particularly to an adjustable flow bean adapted to be employed at the well head of an oil well.

Flow beans employed to regulate the flow of well fluid out of an oil well are, conventionally, large needle valves in which a conical element is adjusted to various longitudinal positions in an opening. A serious fault of such valves is that when the valve setting is small the orifice is ring shaped and very thin or narrow, the width of the annulus being frequently only a few thousandths of an inch. The annular hair-thin opening is subject to being clogged by foreign matter such as gummy oil fractions, and is particularly subject to being clogged by ice which forms, particularly during cold weather, as the result of the pressure drop across the valve.

It has heretofore been proposed to construct metering valves in which a longitudinally grooved rod is shifted to various longitudinal positions in an opening, the size of the groove being varied so that the amount of flow through the groove is determined by the rod position. Such valves, however, are relatively expensive to manufacture and are characterized by clogging of the groove when the valve setting is small. Furthermore, and very importantly such valves permit the flow of fluid between the rod and opening wall at points remote from the groove, thus adversely affecting the metering function of the valve and, under certain conditions, resulting in formation of ice around the rod and consequent sticking of the valve. Such valves, and also conventional needle valves or flow beans, are subject to the further defect that complete shut off or sealing may not be achieved, particularly where the fluid is a light one or contains gas.

In view of the above factors characteristic of conventional flow beans and similar valves, it is an object of the present invention to provide a combination metering and shut-off valve adapted when in certain positions to meter accurately the flow of fluid through the valve and when in other positions to block completely the flow of fluid therethrough.

Another object of the invention is to provide a metering valve or flow bean having a fluid passage located at one point in the valve instead of around a circle, said fluid passage having a relatively uniform shape regardless of the valve setting.

Another object is to provide a combination metering and shut-off valve having novel sealing means adapted to prevent fluid flow except through a predetermined groove, and to entirely block fluid flow at certain valve positions.

An additional object is to provide a valve the plug portion of which may be rotated to any desired position without altering the valve characteristics.

A further object is to provide a combination shut-off and metering valve which is economical to construct and operate, and which minimizes the possibility of clogging or freezing.

Another object is to provide a metering valve which will not freeze or stick despite passage of gas and water therethrough from a high pressure to a low pressure, and despite a relatively low ambient temperature.

These and other objects and advantages of the invention will be more fully set forth in the following specification and claims, considered in connection with the attached drawing to which they relate.

In the drawing:
Figure 1 is a longitudinal central sectional view of a combination metering and shut-off valve constructed in accordance with the present invention;
Figure 2 is an enlarged transverse section taken on line 2—2 of Figure 1; and
Figure 3 is an enlarged section on line 3—3 of Figure 1.

Referring to the drawing, the valve may be seen to comprise generally a valve casing 10, a container ring or insert 11 mounted in the casing 10, a tapered-groove orifice plug 12 movably mounted in the container ring, sealing means 13 provided between plug 12 and the container ring, and means 14 to shift plug 12 to various settings.

The illustrated valve casing 10 comprises a cylindrical or tubular body 16 having an axial discharge opening 17 at one end thereof and a radial inlet opening 18 at the mid-portion thereof. The end of body 16 remote from discharge opening 17 is threaded at 19 to receive a casing extension 21.

The container ring or insert 11 is generally tubular in shape and is threaded into casing body 16 between inlet 18 and outlet 17. A head portion 23, having a larger diameter than the rest of the insert, is integrally provided on the insert adjacent inlet 18 and seats over an internal shoulder portion 24 of the valve body. The inner wall 26 of head 23 is frustoconical and diverges upwardly or toward the inlet 18. Such frustoconical wall 26 communicates with the cylindrical passage 27 in the insert, both the wall 26 and the passage 27 being coaxial with the valve body 16.

Plug 12 comprises a cylinder having a diameter slightly less than the diameter of passage 27, so that the plug may rotate in the passage 27 and shift longitudinally thereof. A tapered groove 28 is formed longitudinally of plug 12 and diverges toward the outlet 17. More specifically, groove 28 has a V-section throughout, being formed with two triangular and corresponding walls 29 which meet at an apex line 31. Walls 29 each lie in a single plane, and apex 31 lies in a plane containing the axis of plug 12. Apex 31, however, is not parallel to the axis of plug 12 but instead is oblique thereto, extending from a point A relatively adjacent inlet 18 and on the surface of plug 12 to a second point B relatively adjacent outlet 17. Point B is, as best illustrated in Figure 3, relatively adjacent the surface of plug 12 diametrically opposite the plug surface on which point A is located.

The preferred angle between walls 29 is 90°, but the angle may vary between 45° and 135°. When the angle is less than 45°, relatively large particles in the fluid tend to clog in the groove 28, and when the angle is greater than 135° such relatively large particles tend to clog between the walls 29 and sealing means 13 when the valve is set for a small orifice opening.

Sealing means 13 comprises an annular groove 32 formed in the wall of passage 27 relatively adjacent the narrow end of frustoconical head wall 26. An O-ring 33, formed of a suitable elastomeric or plastic material, is mounted in groove 32 and protrudes a slight distance above the wall of passage 27.

A shoulder 36 is formed on plug 12 in spaced relation from the adjacent end of apex 31, that is to say from point A. The spacing between the shoulder 36 and point A is such that the cylindrical plug surface between point A and the shoulder will be in sealing engagement with O-ring 33 when the shoulder is in engagement with frusto-conical wall 26. It follows that when the shoulder engages wall 26 there will be a complete 360° seal between O-ring 33 and a cylindrical surface of plug 12, thus effecting complete blocking of flow through the valve. A secondary seal is present between the edge of shoulder 36 and wall 26.

The means 14 for shifting the plug 12 in insert 11 comprises a cylindrical rod or shaft 37 which is either integral with or connected to the plug. Shaft 37 extends axially of body 16 and into casing extension 21, the latter having an internally threaded end 38 which mates with the externally threaded end portion of shaft 37. A hand wheel 39 is provided on the outer shaft end, and suitable packing means 41 is provided around shaft 37 to prevent leakage therearound into the casing extension 21. Rotation of the hand wheel 39 effects rotation of shaft 37 and plug 12, and also effects longitudinal shifting of plug 12 in insert 11 because of the threaded relationship between shaft 37 and casing extension end 38.

*Operation*

Let it be assumed that the valve is employed as a flow bean at the well head of an oil well, the inlet 18 and outlet 17 being connected in the flow line of the well. It is to be understood that the well fluid flowing through the flow line comprises a mixture of crude oil, water, gas and other material. In addition, it is to be understood that a very substantial pressure drop takes place across the valve to result in a cooling action, such cooling being especially severe in cold weather.

When it is desired to block completely the flow of fluid through the valve, hand wheel 39 is turned until shoulder 36 engages wall 26. There is then a complete seal between O-ring 33 and the cylindrical surface of plug 12 between point A and shoulder 36.

To open the valve, hand wheel 39 is rotated in a direction effecting upward shifting of plug 12 in passage 27. A flow orifice will then be present, being defined on two sides by the groove walls 29 of plug 12, and on the remaining side by the wall 27 of insert 11. The shape of the orifice is relatively constant, regardless of plug position, there always being two straight sides and one arcuate side. Because of the presence of O-ring 33, no flow is possible except through the groove 28. The concentrated flow of fluid through the above-described orifice minimizes the possibility that the valve will clog or freeze.

It is pointed out that relatively large particles may flow through the orifice, even at relatively small or restricted valve settings, as compared to valves in which the flow is through an annulus around a conical rod. Furthermore, because the flow is concentrated at one point, any freezing which occurs will be immaterial, it having been found that any ice crystals which form are immediately swept away by the fluid. No freezing occurs around the plug 12 remote from groove 28 because the O-ring 33 prevents fluid flow except through the groove.

It is pointed out that the valve is simple to construct and operate. The groove 28 may be formed in a simple milling operation, and there is no necessity to provide complicated means for maintaining the plug 12 in a given rotated position. Instead, the plug 12 rotates with shaft 37 as previously stated.

Various embodiments of the present invention, in addition to what has been illustrated and described in detail, may be employed without departing from the scope of the accompanying claims.

I claim:

1. A combination metering and shut-off valve, which comprises a generally cylindrical valve casing having an inlet opening and an outlet opening, an insert threadedly mounted in said casing, said insert having a cylindrical passage therethrough, a cylindrical plug mounted in said insert passage for longitudinal rotational movement therein, a threaded rod connected to said plug and threadedly mounted in said casing, means to rotate said threaded rod to effect rotational movement of said plug and also longitudinal movement of said plug in said insert passage, an O-ring mounted in said insert around said plug, single tapered groove means formed in said plug, said tapered groove means including two groove walls each lying in a single plane and meeting at an apex, said apex lying in the same plane as the axis of said plug but being oblique to said axis, the angle between said groove walls being from 45° to 135°, and shoulder means provided on said plug to limit the amount of insertion thereof into said insert passage, the narrow end of said tapered groove means being disposed in spaced relationship from said shoulder means whereby the ungrooved portion of said plug between said narrow end and said shoulder means may be disposed in engagement with said O-ring when said shoulder means is in engagement with said insert, thereby completely blocking the flow of fluid through the valve.

2. The invention as claimed in claim 1, in which said angle between said groove walls is approximately 90°.

References Cited in the file of this patent

UNITED STATES PATENTS

| | | |
|---|---|---|
| 45,390 | Cresson | Dec. 13, 1864 |
| 1,619,937 | Huff | Mar. 8, 1927 |
| 1,804,462 | Eggleston | May 12, 1931 |
| 2,007,051 | Hirvonen | July 2, 1935 |
| 2,013,822 | Bradbury | Sept. 10, 1935 |
| 2,014,314 | Defenbaugh | Sept. 10, 1935 |
| 2,556,308 | Weatherhead | June 12, 1951 |
| 2,574,851 | Wagner | Nov. 13, 1951 |
| 2,659,568 | Grove | Nov. 17, 1953 |

FOREIGN PATENTS

| | | |
|---|---|---|
| 621,142 | Great Britain | Apr. 5, 1949 |